Figure 1:
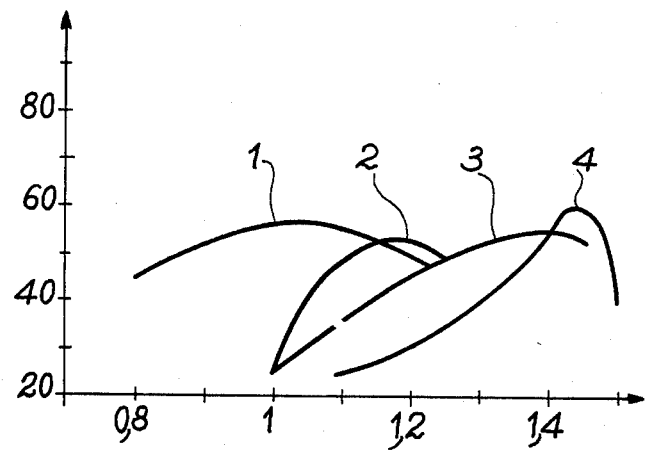

United States Patent [19]

de Tassigny

[11] Patent Number: 4,599,196

[45] Date of Patent: Jul. 8, 1986

[54] PROCESS FOR THE CONDITIONING OF CONTAMINATED WASTE, PARTICULARLY CATION EXCHANGE MATERIALS

[75] Inventor: Christian de Tassigny, Sassenage, France

[73] Assignee: Commissariat a l'Energie Atomique, Paris, France

[21] Appl. No.: 598,528

[22] Filed: Apr. 9, 1984

[30] Foreign Application Priority Data

Apr. 21, 1983 [FR] France ................. 83 06572

[51] Int. Cl.⁴ ............... G21F 9/16; B05D 3/00; C08F 8/32
[52] U.S. Cl. ................. 252/628; 252/626; 427/6; 427/221; 427/222; 427/299; 427/385.5; 427/386; 427/401; 427/407.1; 521/32
[58] Field of Search ........... 252/628, 631, 626, 632; 521/32; 427/221, 222, 299, 386, 401, 407.1, 385.5, 5, 6

[56] References Cited

U.S. PATENT DOCUMENTS

| | | | |
|---|---|---|---|
| 3,723,338 | 3/1973 | Godfrey | 252/626 |
| 4,077,901 | 3/1978 | Arnold et al. | 252/628 |
| 4,122,048 | 10/1978 | Buchwalder et al. | 252/628 |
| 4,234,632 | 11/1980 | Lubowitz | 428/2 |
| 4,315,831 | 2/1982 | Morin et al. | 252/628 |

FOREIGN PATENT DOCUMENTS

| | | | |
|---|---|---|---|
| 3018749 | 11/1981 | Fed. Rep. of Germany | 252/628 |
| 2251081 | 2/1975 | France | 252/626 |
| 2361724 | 8/1976 | France . | |
| 2356246 | 5/1977 | France . | |
| 2505539 | 5/1982 | France . | |
| 0071499 | 4/1983 | Japan | 252/628 |
| 2032165 | 4/1980 | United Kingdom | 252/628 |
| 2101797 | 1/1983 | United Kingdom | 252/628 |
| 0524437 | 7/1982 | U.S.S.R. | 252/628 |

OTHER PUBLICATIONS

Hawley, G., 1981, The Condensed Chemical Dictionary, 10th edition, Van Nostrand Reinhold Company, New York, p. 48.

Primary Examiner—Stephen J. Lechert, Jr.
Assistant Examiner—Howard J. Locker
Attorney, Agent, or Firm—Pearne, Gordon, Sessions, McCoy, Granger & Tilberry

[57] ABSTRACT

Process for the conditioning of waste, such as radioactive or toxic waste, whose acidity can inhibit polymerization reactions, e.g. waste containing cation exchange materials.

This process consists of incorporating the waste into a liquid epoxy resin at ambient temperature and then bringing about the polymerization of the resin by means of a hardener, in order to obtain a solid block.

A hardener containing at least one compound having at least one $NH_2$ group in an adequate quantity for blocking the active sites of the cation exchange materials present in the waste or for neutralizing the acidity of the humid waste and for polymerizing the epoxy resin is used.

This process can be more particularly used for conditioning resin beds used for the purification of the water of nuclear power stations.

13 Claims, 5 Drawing Figures

PROCESS FOR THE CONDITIONING OF CONTAMINATED WASTE, PARTICULARLY CATION EXCHANGE MATERIALS

The present invention relates to a process for conditioning waste, such as radioactive or toxic waste, whose acidity can inhibit polymerization reactions.

It more particularly applies to the conditioning of waste mainly constituted by cation exchange material, e.g. cationic resins or a mixture of cationic and anionic resins contaminated by radioactive elements, or other acid function materials, e.g. salts in the form of powder or grains in an acid humid medium.

It also applies to the conditioning of waste constituted by evaporation concentrate powders (salts such as borates, sulphates, chlorides), ground spent ion exchange resins with a 65% moisture content and technical waste such as filters, metal filings, plastics, wood, etc.

The ion exchange resins can in particular be polystyrene resins, crosslinked with divinyl benzene, which have sulphonic groups $HSO_3$ (cationic resins) or a mixture of such resins with polystyrene resins, crosslinked with divinyl benzene and which have OH functions fixed to a quaternary ammonium group (anionic resins).

When the cation exchange resins are used for purifying contaminated waters, particularly the effluents of nuclear installations, after a certain time they undergo degradation phenomena and consequently lose their effectiveness. It is then a question of conditioning these spent ion exchange resins which, during use, have fixed a certain number of radio elements whilst ensuring a good retention of their radioactivity.

In French certificate of addition EN No. 73/40005, filed on 9.11.1973 and published under No. 2 251 081, is described a process for the conditioning of radioactive waste, which is applicable to the conditioning of ion exchange resins used for the purification of contaminated water and in particular battery water.

According to this process, ion exchange resins are incorporated into a thermosetting resin, which is polymerizable at ambient temperature and constituted e.g. by an unsaturated polyester or an epoxy resin. The polymerization of this resin is brought about in order to obtain a solid block. However, although this process is satisfactory for anionic resins, it cannot be used under the same operating procedure for cationic resins, which are not completely spent, i.e. which still contain $H^+$ ions.

Thus, it is found that in this case, the polymerization of the thermosetting resin does not take place in a total manner due to the presence of active sites on the non-spent cationic resins, i.e. the presence of $H^+$ protons, which are able to consume certain of the reagents used for the hardening of the resin.

To solve this problem, not totally saturated, spent ion exchange resins have been subject to a pretreatment by means of an aqueous solution of a basic compound able to block the active sites of the cationic resins, in the manner described in French Patent No. 76/24624, filed on 12.8.1976 and published under No. 2 361 724.

However, the performance of such a pretreatment in the liquid phase suffers from other disadvantages. Thus, it requires a complementary pretreatment installation upstream of the conditioning installation and it also leads to the production of contaminated effluents resulting from the discharge into the liquid pretreatment phase of part of the radio elements which were fixed to the ion exchange resins.

The object of the present invention is a process for the conditioning of contaminated waste, whose acidity can inhibit the polymerization reactions, particularly cation exchange materials and which makes it possible to obviate the disadvantges of the prior art processes.

The process according to the invention consists of incorporating the waste into a liquid epoxy resin at ambient temperature, and then bringing about the polymerization of the resin by means of a hardener in order to obtain a solid block. According to the invention, the hardener comprises at least one compound containing at least one $NH_2$ group in a sufficient quantity to polymerize the epoxy resin and block the acidity of the waste.

According to a first embodiment of the process according to the invention, a hardener quantity is used which is such that it corresponds to an excess compared with the quantity necessary for polymerizing the epoxy resin, in order to use this excess for blocking the acidity of the waste or the active sites of the cation exchange materials present in said waste.

Thus, in this first embodiment of the process of the invention, use is made of the hardener excess for neutralizing the $H^+$ sites of the cation exchange materials and to in this way obtain solid blocks having satisfactory radioactivity retention properties.

In this first embodiment of the process according to the invention, the epoxy resin is advantageously a bisphenol A diglycidyl ether with an epoxy equivalent of approximately 190. The viscosity of the epoxy resin can be regulated to an appropriate value by adding a direactive diluent with a low vapour tension constituted e.g. by neopentyl diglycidyl ether.

In this first embodiment of the process according to the invention, the compounds having at least one $NH_2$ which can be used are cycloaliphatic or aromatic amines, aromatic amines, aromatic or cycloaliphatic polyamines and propylene amine derivatives. It is also possible to use polyaminoamides.

The hardener can be constituted by a compound of this type, in the pure state or dissolved in an appropriate diluent, such as benzyl alcohol. However, preference is generally given to hardeners constituted by adducts, which are the product of the reaction of a small amount of epoxy resin with said compound containing at least one $NH_2$ group, optionally dissolved by a diluent.

Preferably, in the first embodiment of the process according to the invention, the hardener is constituted by a prepolymerized mixture or adduct obtained by the reaction of a small amount of epoxy resin with an aromatic amine. Preferably, the aromatic amine used in this case is diaminodiphenyl methane of formula:

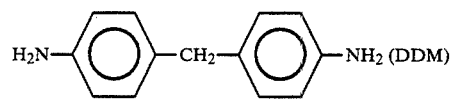

In certain cases, it is advantageous to use a hardening accelerator, e.g. constituted by a salt obtained by the reaction of acrylic acid, benzoic acid, salicylic acid, or phenols such as resorcinol with the aromatic amine.

The hardener quantity used for obtaining the polymerization and crosslinking of the epoxy resin is dependent on the epoxy resin used, particularly its epoxy equivalent, i.e. the resin mass containing an epoxy function. In general, in order to bring about the hardening and crosslinking of the epoxy resin, use is made of a hardener quantity such that there is one amine function $NH_2$ per equivalent of epoxy resin.

In the first embodiment, in order to block the acidity of the waste or the active sites of the cation exchange materials, use is made of a hardener excess, which more particularly depends on the content of the cation exchange materials in the waste to be treated, or the waste acidity and the hardener used. In general, a hardener excess is used, such that the hardener/epoxy resin weight ratio exceeds 0.5. Moreover, the hardener quantity used increases with the content of cation exchange materials in the radioactive waste or their acidity and it is possible to use a hardener/epoxy resin weight ratio varying between 0.5 and 1.5, when the cation exchange material content of the waste varies from 0 to 100%.

According to a second embodiment of the process of the invention, an appropriate hardener is chosen in order on the one hand to block the active sites of the cation exchange materials or partly or totally neutralize the acidity, and on the other hand to bring about the hardening of the epoxy resin without it being necessary to use a variable quantity hardener excess. In this case, the hardener contains compounds having at least one $NH_2$ group of an aliphatic polyamine and at least one $NH_2$ group of an aromatic amine.

Due to the choice of these compounds, it is possible to obtain under good conditions the neutralization of $H^+$ sites of cation exchange materials and a satisfactory hardening of the epoxy resin. Thus, it is assumed that an aliphatic polyamine having a high basicity, carries out in a preferred manner the neutralization of the $H^+$ sites of a cation exchange materials or the acidity of the waste. Moreover, during this neutralization, the polyamines are transformed into amine salts, which then act as an accelerator for the polymerization and crosslinking of the epoxy resin.

As hereinbefore, the epoxy resins used in this second embodiment of the process according to the invention are preferably bisphenol A diglycidylether with an epoxy equivalent of approximately 190 and their viscosity can also be regulated by adding a reactive diluent, such a neopentyl digylcidyl ether.

In this second embodiment of the process according to the invention, the polyamines which can be used are aliphatic or cycloaliphatic polyamines. Preferably use is made of a cycloaliphatic polyamine having an amine number close to 63.

In this second embodiment the aromatic amine used is advantageously diamino diphenyl methane (DDM), preferably in the form an an adduct with a low epoxy resin quantity.

As hereinbefore, the adduct can comprise a non-reactive diluent, such as benzyl alcohol and optionally a hardening accelerator constituted e.g. by the product of the reaction of acrylic acid, benzoic acid, salicylic acid or phenols, e.g. resorcinol, with diamino diphenyl methane.

However, in view of the high reactivity of cycloaliphatic polyamine and its transformation into a salt, there is no need to add a hardening accelerator, the polyamine salt formed during the neutralization of the active sites of the cation exchange material already serving as a hardening accelerator.

In this second embodiment of the process according to the invention, through the choice of compounds having $NH_2$ groups and particularly the presence of a compound having a high basicity, there is no need to use a variable content hardener excess to obtain on the one hand the blocking of the active sites of the cation exchange materials or the partial or total neutralization of the acidity of the waste, and on the other hand the hardening of the epoxy resin. Generally, use is made of a hardener quantity such that the hardener/epoxy resin weight ratio exceeds 0.5 and is e.g. 0.6. It is not necessary to use a larger quantity of hardener, when the cation exchange material content of the waste increases. Moreover, very good results are also obtained when the comtaminated waste contains no cation exchange materials. Thus, the hardener composition of the second embodiment of the process of the invention is particularly advantageous, because it can be used for the conditioning of any random type of contaminated waste.

Finally, in this second embodiment of the process according to the invention, it is possible to adapt the hardener by regulating the aliphatic polyamine/aromatic amine ratio, as a function of the degree of humidity of the waste. It is also possible to control the exothermicity of the polymerization reaction by regulating said aliphatic polyamine/aromatic amine ratio. Thus, the increase of the aliphatic amine level makes it possible to accept a larger quantity of water in the waste. Conversely, the increase in the aromatic amine level makes it possible to reduce the exothermicity of the polymerization reaction. Furthermore, in this second embodiment, the aliphatic polyamine/aromatic amine ratio is preferably chosen as a function of the water content of the waste to be conditioned.

In the two embodiments of the process according to the invention, there is consequently no need for the pretreatment stage which was required in the prior art for conditioning the radioactive waste containing cation exchange materials. This is an important advantage which makes it possible to obviate the production of new contaminated effluents.

Moreover, when using the hardener of the second embodiment of the process according to the invention, it is possible to improve the characteristics of the blocks obtained, particularly their mechanical strength.

Figure 2:
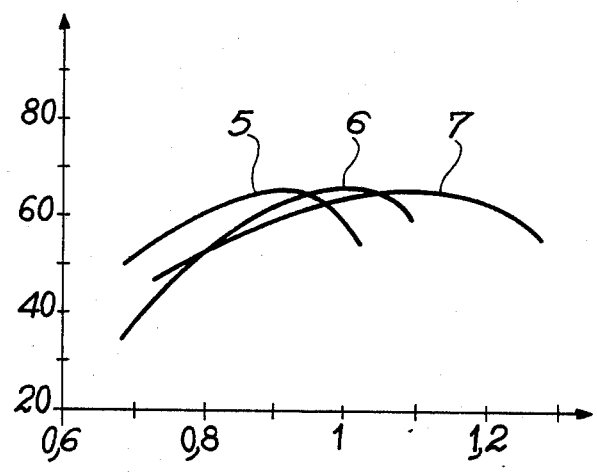

Other features and advantages of the invention can be gathered from the study of the following examples given in an illustrative and non-limitative manner and with reference to the attached drawings, wherein show:

FIGS. 1 and 2 illustrate the variations of the Shore hardness of blocks obtained according to the invention, as a function of the hardener/epoxy resin weight ratio used for the preparation of these blocks.

Figure 3:
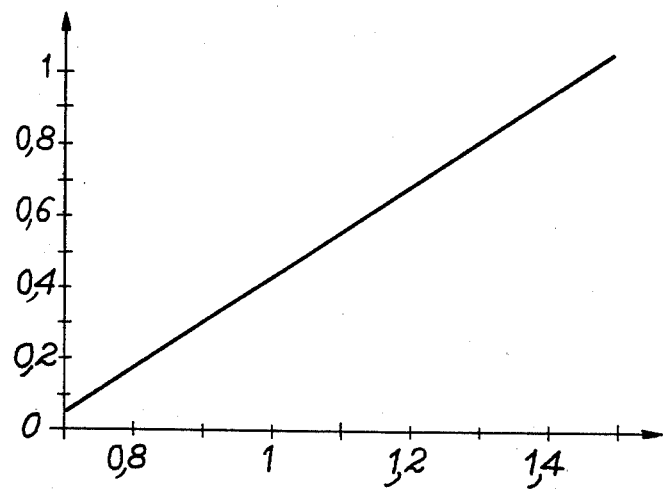
Figure 4:
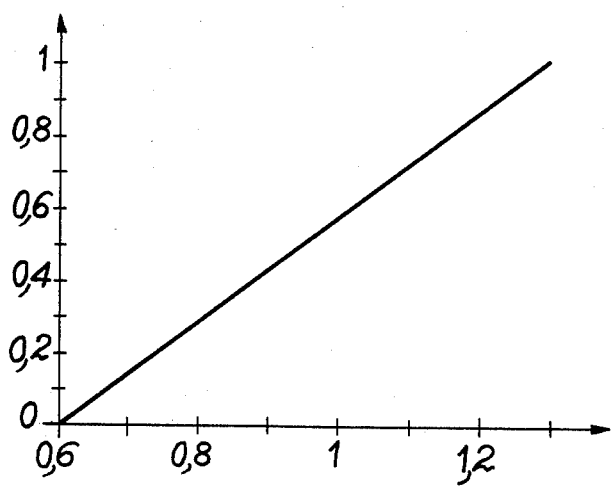

FIGS. 3 and 4 graphs making it possible to determine the optimum hardener/epoxy resin ratio, as a function of the cationic resin content of a mixture of cationic and anionic means.

Figure 5:
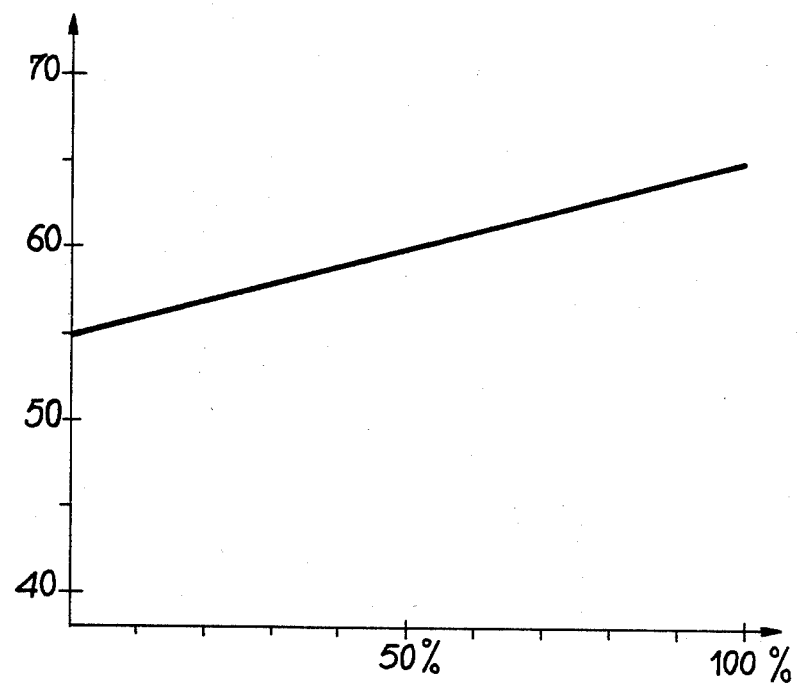

FIG. 5 a diagram illustrating the variations of the Shore hardness of the blocks obtained according to the invention, as a function of the cationic resin content (as a %) of the mixture of cationic and anionic resins treated.

EXAMPLES 1 TO 4

In these examples, a study is made of the influence of the hardener/epoxy resin weight ratio on the treatment of radioactive waste, whose cationic resin content varies between 50 and 100% by weight.

The waste is constituted by a mixture of a cationic resin C20H marketed by DIAPROSIM and an anionic resin ARA9366 marketed by DISPROSIM. The conditioning is carried out by an epoxy resin constituted by a bisphenol A diglycidyl ether with an epoxy equivalent of approximately 190, diluted by neopentyl diglycidyl ether. The hardener used is a diamino diphenyl methane adduct.

After performing a drying process on the mixture of cationic and anionic resins, or on the cationic resins in order to remove the water, the dried resins are mixed with the epoxy resin in epoxy resin weight proportions which can range between 40 and 60%. This is followed by the addition to the mixture of the desired quantity of hardener, which can vary in such a way that the hardener/epoxy resin ratio is between 0.5 and 1.5%.

The reaction is performed at ambient temperature (substantially 25° C.) and polymerization is allowed to continue for the desired time, which is generally several hours. The fact that this polymerization takes place slowly makes it possible to spread the heat of the reaction over a period of time and it is therefore possible to limit the temperature rise within the reaction medium to a temperature below 100° C.

After polymerization and hardening, the blocks obtained are subject to hardness tests in order to test their mechanical properties. The results obtained are given in FIG. 1, which illustrates the variations of the Shore hardness of the block obtained as a function of the hardener/epoxy resin weight ratio used for the preparation of this block.

Curve 1 relates to a mixture containing 50% cationic resin, curve 2 relates to a mixture containing 66% cationic resin, curve 3 relates to a mixture containing 85% cationic resin and curve 4 relates to the treatment of waste constituted solely by cationic resin.

It can be seen from these curves that in each case there is an optimum value of the hardener/epoxy resin ratio. Moreover, it can be seen that this optimum ratio increases with the cationic resin content of the mixture.

EXAMPLES 5 TO 7

In these examples use is made of anionic and cationic resin mixtures identical to those used in Examples 1 to 4 and the conditioning of these mixtures is carried out with the epoxy resin marketed by Ciba Geigy under mark XF 431 and the hardener XF 348 which is also marketed by Ciba Geigy.

These mixtures are coated under the same conditions as in Examples 1 to 4 using epoxy resin weight proportions between 40 and 60%. As hereinbefore, the Shore hardness of the blocks obtained is then determined.

The results obtained are given in FIG. 2, whose curves 5, 6 and 7 illustrate the Shore hardness variations as a function of the hardener/epoxy resin ratio during the treatment of the different anionic cationic resin mixtures.

Curve 5 relates to a mixture containing 33% of cationic resin, curve 6 to a mixture containing 50% cationic resin and curve 7 to a mixture containing 85% cationic resin.

As hereinbefore, it can be seen that it is necessary to increase the hardener/epoxy resin ratio to obtain good results, when the cationic resin content of the mixture increases.

On the basis of the curves of FIGS. 1 and 2, it is possible to plot graphs making it possible to determine which is the optimum hardener/epoxy resin ratio when the cationic resin content of the waste increases from 0 to 100%.

On FIG. 3 is plotted the line making it possible to determine the hardener/epoxy resin ratio as a function of the cationic resin content of the mixture, when using the epoxy resin and hardener of Examples 1 to 4.

In FIG. 1 is plotted the line making it possible to determine the optimum hardener/epoxy resin ratio as a function of the cationic resin content of the waste to be treated, when using the epoxy resin and hardener of Examples 5 to 7.

It can be seen from these two Figs., that the ratio increases in linear manner with the cationic resin content of the waste to be treated. Thus, in the case of radioactive waste constituted by mixed beds of resins from battery water purification installations, the beds generally contain $\frac{2}{3}$ of cationic resin and $\frac{1}{3}$ of anionic resin, the hardener/epoxy resin weight ratio can be advantageously approximately 1.1 to 1.2.

EXAMPLE 8

This example relates to the conditioning of mixtures containing anionic and cationic resins identical to those of Examples 1 to 4, whilst using the second embodiment of the process according to the invention.

Use is made here of the same epoxy resin as in Examples 1 to 7, as well as a hardener formed from a cycloaliphatic polyamine having an amine equivalent of approximately 63 and a diamino diphenyl amine adduct and epoxy resin having an amine equivalent of approximately 130, marketed by CdF Chimie under reference D6M4.

After performing a drying operation on the cationic and anionic resins to remove the water, as in Examples 1 to 4, the dried resins are mixed with epoxy resin in epoxy resin weight proportions between 40 and 60%. The hardener is then added to the mixture in a quantity such that the hardener/epoxy resin ratio is 0.6.

The reaction is performed at ambient temperature (substantially 20° C.) and polymerization is allowed to continue for several hours. As in Examples 1 to 4, the Shore hardness of the blocks obtained is then determined and is between 55 and 65. The results are given in FIG. 5, which illustrates the variations of the Shore hardness of the blocks, as a function of the cationic resin content (as a %) of the treated resin mixture.

Thus, through using a combination of amines and polyamines, it is possible not only to carry out the blocking of the active sites of the cation exchange resins and the hardening of the epoxy resin without any hardener excess, but also to additionally obtain improved mechanical characteristics.

The results of leaching tests carried out on the blocks obtained in Examples 2, 4 and 8 are given, the leaching levels being determined on coated products according to the AIEA standards, corresponding to orthocylindrical testpieces with a diameter of 50 mm. The leaching levels after 60 days are all below $4 \cdot 10^{-7}$ cm/day$^{-1}$ for cobalt-60 and $8 \cdot 10^{-6}$ cm/day$^{-1}$ for cesium 137.

EXAMPLE 9

This Example relates to the coating of a humid waste in an acid medium, namely lead iodide which is reprocessing waste material. Lead iodide is insoluble in nitric acid. It is possible to coat it in epoxy resins according to the invention and its two embodiments.

In this example, use is made of the second embodiment and 10 kg of waste constituted by dry lead iodide or in aqueous suspension up to 60% by weight of the proportion of the waste with 6.3 kg of epoxy resin marketed under the reference MN201T by CdF Chimie and 3.7 kg of a hardener constituted by the product marketed under the reference D6M5 by CdF Chimie. As in Example 8, the latter is constituted by a cycloaliphatic polyamine having an amine equivalent of approximately 63 and a diamino diphenyl methane adduct, as well as epoxy resin with an amine equivalent of approximately 130, but with an aliphatic amine content below that of hardener D6M4.

EXAMPLE 10

In this example, 100 kg of waste are conditioned. ⅔ of the waste is constituted by cation exchange resins Diaprosim C20H and ⅓ by anion exchange resin Diaprosim ARA 93 66 with a total humidity content after drying of 55%. The 100 kg of waste is mixed with 63 kg of epoxy resin MN 201T of Example 9 and with 37 kg of hardener D6M5 of Example 9.

Under these conditions, after mixing, the temperature in the core of the coated material remains below 100° C. and the Shore hardness of the blocks obtained is approximately 60 after 24 h.

The leaching levels after 60 days are all below $4 \cdot 10^{-7}$ cm/day$^{-1}$ for cobalt-60 and $8 \cdot 10^{-6}$ cm/day$^{-1}$ for cesium 137.

EXAMPLE 11

100 kg of waste, identical to that treated in Example 10, are mixed with 63 kg of epoxy resin marketed by CdF Chimie under reference MP 195 RD 07 and 37 kg of hardener D6M5 of Example 9.

Under these conditions, the temperature rise within the reaction mixture remains below 80° C. This exothermicity reduction results from the use of epoxy resin MP 195 RD 07, whose reactive diluent differs from that used for epoxy resin MN 201T.

EXAMPLE 12

In this case, 100 kg of waste are conditioned. ⅓ of the waste is constituted by anion exchange resin Diaprosim ARA 93 66 and ⅔ by cation exchange resin Diaprosim C 20 H with a moisture content of 65% and obtained by removing the supernatant water above the mixture of ion exchange resins.

The 100 kg of waste are mixed with 63 kg of epoxy resin MN 201 T of Example 9 and 37 kg of hardener D6 4M of Example 8. The latter has an aliphatic amine content above that of hardener D6 M5 used in Examples 9 to 11. Under these conditions, the Shore hardness of the blocks obtained is approximately 60 after 24 hours and the leaching levels are identical to those obtained in Example 10.

EXAMPLE 13

In this example, 100 kg of waste, constituted by evaporation concentrates in the form of borates are treated. They are mixed with 40 kg of epoxy resin MN 201T of Example 9 and 26 kg of hardener D6 M5 of Example 9. A Shore hardness exceeding 70 is obtained after the solidification of the block.

EXAMPLE 14

In this example, 100 kg of evaporation concentrate identical to that of Example 3 are treated, by mixing them with 40 kg of epoxy resin MN 201 marketed by CdF Chimie and 26 kg of hardener D6 M5 of Example 9, the hardener/resin ratio being equal to 0.6.

After hardening, a coating of the same epoxy resin is placed around the block, using the same hardener for producing a confinement barrier. This gives a diffusion coefficient for cesium in the aqueous medium of approximately $10^{-13}$ cm$^2$s-1. The epoxy resin MN 201 is identical to that of Example 13, but is not thixotropic.

EXAMPLE 15

100 kg of metallic waste in the form of tubes and steel filings are treated with a mixture composed of 32 kg of epoxy resin MN 201T of Example 9, 18 kg of hardener D6M5 of Example 9 and 50 kg of sand.

Following mixing and hardening, this leads to blocks having satisfactory properties. It is pointed out that the addition of a charge (sand) is indispensable for obviating the appearance of cracks, due to the volume contraction of the epoxy resin during its hardening.

What is claimed is:

1. A process for the conditioning of waste, whose acidity can inhibit polymerization reactions, consisting of incorporating said waste into a liquid thermosetting resin consisting essentially of epoxy resin at ambient temperature, polymerizing the resin by using a hardener comprising an aliphatic polyamine and an aromatic amine having at least one NH$_2$ group, for blocking the acidity of the waste and for polymerizing the epoxy resin to obtain a solid block of polymerized resin including said waste.

2. A process according to claim 1, wherein the epoxy resin is a bisphenol A diglycidyl ether.

3. A process according to claim 1, wherein the epoxy resin is diluted by a direactive diluent.

4. A process according to claim 3, wherein the direactive diluent is neopentyl diglycidyl ether.

5. A process according to claim 1, wherein the waste consists of cation exchange resins.

6. A process according to claim 1, wherein the aromatic amine is diamino diphenyl methane.

7. A process according to claim 1, wherein the hardener is initially reacted with a predetermined quantity of epoxy resin and then added to the liquid thermosetting resin/waste mixture.

8. A process according to claim 7, wherein the hardener also contains a hardening accelerator.

9. A process according to claim 8, wherein the hardening accelerator is a salt obtained by reacting acrylic acid, benzoic acid, salicylic acid, or a phenol, such as resorcinol with aromatic amine.

10. A process according to claim 1, wherein the aliphatic polyamine is a cycloaliphatic polyamine having an amine number close to 63.

11. A process according to claim 1, wherein the aromatic amine is a diamino diphenyl methane adduct.

12. A process according to claim 1, wherein the aliphatic polyamine/aromatic amine ratio in said hardener is chosen as a function of the water content of the waste to be conditioned.

13. A process according to claim 1, wherein said waste comprises cation exchange materials.

* * * * *